(12) United States Patent
Woodard et al.

(10) Patent No.: US 12,291,252 B1
(45) Date of Patent: May 6, 2025

(54) WATER CART

(71) Applicants: Rebecca Woodard, Shirley, MA (US); Timothy Woodard, Shirley, MA (US)

(72) Inventors: Rebecca Woodard, Shirley, MA (US); Timothy Woodard, Shirley, MA (US)

( * ) Notice: Subject to any disclaimer, the term of this patent is extended or adjusted under 35 U.S.C. 154(b) by 345 days.

(21) Appl. No.: 17/724,636

(22) Filed: Apr. 20, 2022

(51) Int. Cl.
    *B62B 1/26*     (2006.01)
    *B62B 1/18*     (2006.01)
    *B62B 1/22*     (2006.01)

(52) U.S. Cl.
    CPC .............. *B62B 1/264* (2013.01); *B62B 1/186* (2013.01); *B62B 1/22* (2013.01); *B62B 2202/028* (2013.01)

(58) Field of Classification Search
    CPC ........... B62B 1/264; B62B 1/186; B62B 1/22; B62B 2202/028
    See application file for complete search history.

(56) References Cited

U.S. PATENT DOCUMENTS

| | | | | |
|---|---|---|---|---|
| 207,225 | A * | 8/1878 | Upstone | ..................... B62B 1/18 280/47.31 |
| 1,213,868 | A | 1/1917 | Harris | |
| 4,468,046 | A | 8/1984 | Rutherford | |
| 4,570,961 | A | 2/1986 | Chateauneuf et al. | |
| 5,071,144 | A | 12/1991 | Tayler | |
| 5,087,061 | A * | 2/1992 | Wallace | ..................... B62B 1/20 280/30 |
| 5,713,583 | A | 2/1998 | Hansen | |
| 5,846,043 | A | 12/1998 | Spath | |
| 7,665,675 | B2 | 2/2010 | Montague | |
| 7,703,776 | B1 * | 4/2010 | Nugent | ..................... B62B 1/22 280/47.26 |
| 9,457,823 | B2 * | 10/2016 | Higbe | ..................... B62B 1/22 |
| 10,508,419 | B1 | 12/2019 | Rand | |
| 10,759,458 | B1 * | 9/2020 | Vallez | ..................... B62B 1/22 |
| 10,800,437 | B2 * | 10/2020 | Paino | ..................... B62B 5/06 |

(Continued)

FOREIGN PATENT DOCUMENTS

| | | | | |
|---|---|---|---|---|
| AU | 2011200926 | A1 * | 9/2012 | |
| DE | 202008001751 | U1 * | 6/2008 | ............... B62B 1/12 |
| GB | 2427174 | A * | 12/2006 | ............... B62B 1/14 |

OTHER PUBLICATIONS

DE-202008001751-U1 English Translation (Year: 2008).*
AU-2011200926-A1 English Translation (Year: 2012).*
GB-2427174-A English Translation (Year: 2006).*

*Primary Examiner* — James A Shriver, II
*Assistant Examiner* — Michael T. Walsh
(74) *Attorney, Agent, or Firm* — Cramer Patent & Design, PLLC.; Aaron R. Cramer

(57) ABSTRACT

The water cart may comprise a frame, a wheel assembly, and a plurality of cargo boxes. The water cart may be a wheelbarrow-like cart for transporting a plurality of 5 gallon buckets containing water. The plurality of cargo boxes may be coupled to the top of the frame and may be held substantially level on the frame by spacers located under the front of each box. The water cart may be moved by a user by lifting a pair of handles and rolling the water cart forward on the wheel assembly. The water cart may comprise single-wide cargo boxes that hold one bucket, double-wide cargo boxes that hold two buckets, or a combination thereof. The water cart may be operable to transport other items in addition to or in place of the buckets. As a non-limiting example, the water cart may transport feed and water.

1 Claim, 5 Drawing Sheets

(56) References Cited

U.S. PATENT DOCUMENTS

| | | | |
|---|---|---|---|
| 2005/0275176 A1* | 12/2005 | Jessop | B62B 1/18 |
| | | | 280/47.31 |
| 2005/0280227 A1* | 12/2005 | Murphy | B62B 1/20 |
| | | | 224/401 |
| 2010/0201091 A1* | 8/2010 | Easterling | B62B 1/20 |
| | | | 29/281.5 |
| 2014/0035262 A1* | 2/2014 | White | B62B 3/027 |
| | | | 280/651 |
| 2018/0273071 A1* | 9/2018 | Henninger | B62B 1/14 |
| 2020/0047787 A1* | 2/2020 | Bacallao | B62B 5/00 |

\* cited by examiner

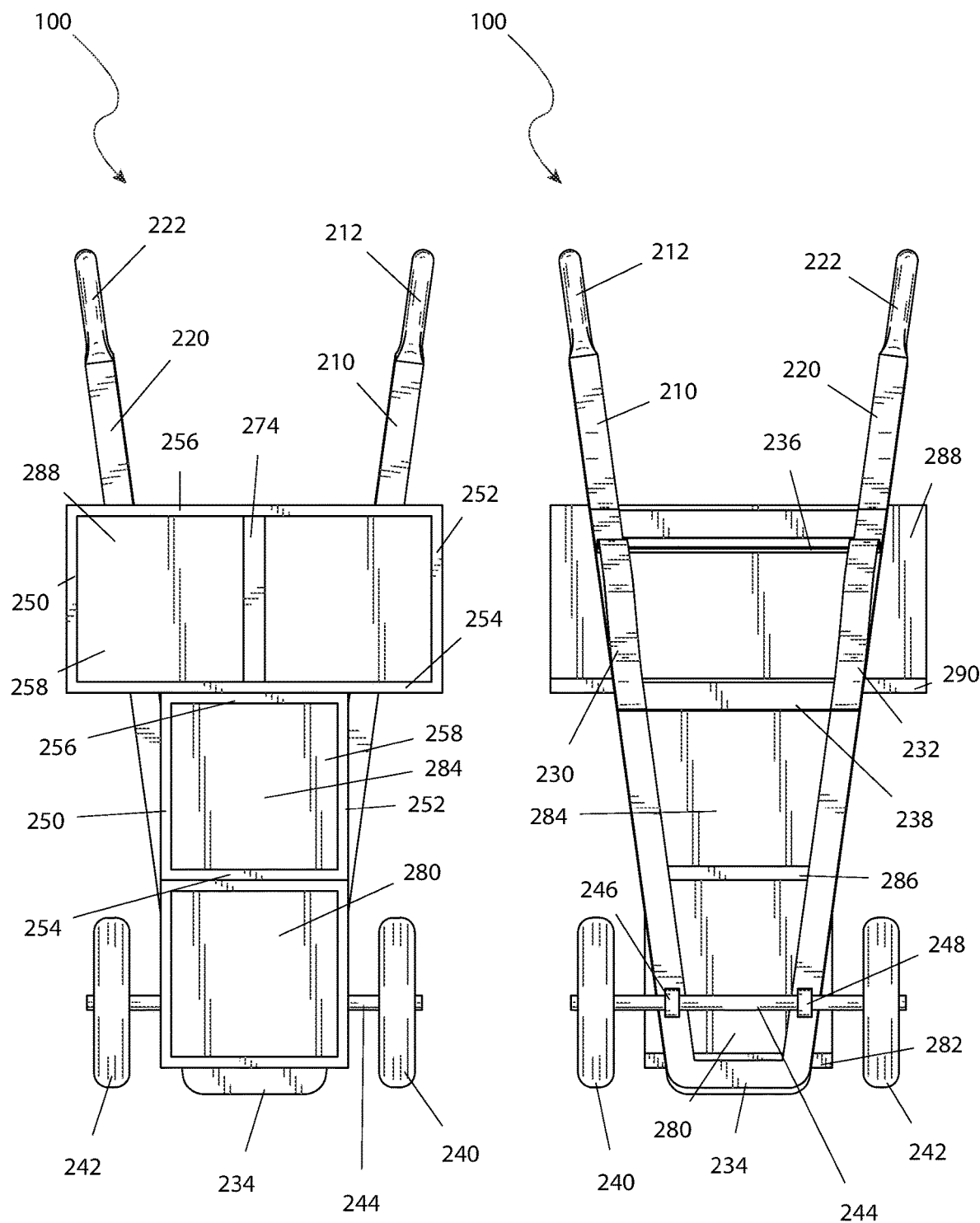

WATER CART

RELATED APPLICATIONS

None.

FIELD OF THE INVENTION

The present invention relates to a water cart and more specifically to a water cart having a wheelbarrow configuration.

BACKGROUND OF THE INVENTION

The care and love of large animals, especially horses, is a laborious and time consuming task. For many, such care is a fulltime job as horses require, food, water, shelter, medical care, grooming, space to run etc.

Historically, the method and manner of moving water to a location for a horse or horses to drink has been particularly physically challenging and time consuming. Some solutions rely upon plumbing to run water directly to the watering trough or the use of machinery. Yet, these solutions are not always practical or affordable. Therefore, a need exists for a means by which water may be transported to a horse or horses in a manner that is easy, safe, and efficient. The development of the water cart fulfills this need.

SUMMARY OF THE INVENTION

The principles of the present invention provide for a wheelbarrow-like carriage that has a frame having a left handle, a right handle, a left leg, a right leg, a front cross brace, and a leg cross brace, a rear end of the left handle tapers to form a left hand grip and a rear end of the right handle tapers to form a right hand grip, a wheel assembly having a left wheel, a right wheel, an axle, a left axle mount, and a right axle mount, a plurality of cargo boxes coupled to on top of the left handle and the right handle, each of the cargo boxes include a left side wall, a right side wall, a front wall, a rear wall, and a box bottom, the cargo boxes also include a front cargo box, a center cargo box, and a rear cargo box. the left hand grip and the right hand grip are adapted for a user to grasp while moving the wheelbarrow-like carriage. The wheel assembly is adapted to reduce friction with a ground surface when the wheelbarrow-like carriage is moved. The wheel assembly is coupled to an underside of a front of the left handle and the right handle. The left wheel and the right wheel are rotationally coupled to opposing ends of the axle and the left wheel and the right wheel are aligned to be in parallel with each other and are aligned with the frame such that the wheelbarrow-like carriage is pushed in a forward direction. The axle is coupled to the left handle via the left axle mount and to the right handle via the right axle mount the cargo boxes are configured to retain a plurality of five gallon buckets on the wheelbarrow-like carriage while the wheelbarrow-like carriage is moved.

The distance between the left handle and the right handle may be greater behind the wheelbarrow-like carriage than in front of wheelbarrow-like carriage. The left leg and the right leg may be operable to support the left handle and the right handle above the ground surface when the wheelbarrow-like carriage is stationary. The front cross brace may couple in front of the left handle to in front of the right handle. The front cross brace may be oriented laterally across the frame and establishes a width in front of the frame. The width in front of the frame may be less than or equal to a width of the front cargo box. The leg cross brace may couple the left leg to the right leg and may be located on the rear side of the left leg and the right leg. The leg cross brace may be oriented laterally across the frame and establishes a width for the frame at a rear end of the rear cargo box. The width of the frame at the rear end of the rear cargo box may be less than or equal to a width of the rear cargo box. The frame may further comprise one or more intermediate cross braces to stabilize the frame. The one or more intermediate cross braces may couple the left handle to the right handle, the left leg to the right leg, or combinations thereof. The one or more intermediate cross braces may be oriented laterally across the frame. The one or more intermediate cross braces may be located at one or more locations between the front cross brace and a rearmost portion of the left leg and the right leg. The cargo boxes may be each held substantially level on the frame by a spacer located under in front of each of the cargo boxes. The box bottom may support the five gallon buckets and the left side wall, the right side wall, the front wall, and the rear wall may prevent each of the five gallon buckets from sliding off of the wheelbarrow-like carriage. each of the cargo boxes may be a single-wide cargo box. each of the cargo boxes may be a double-wide cargo box. The rear cargo box may include a center divider to separate two of the five gallon buckets when in the double-wide cargo box. A front spacer may be located under a front edge of the front cargo box and may be attached thereto, a center spacer may be located under a front edge of the center cargo box and may be attached thereto, and a rear spacer may be located under a front edge of the rear cargo box and may be attached thereto to keep the cargo box level. The wheelbarrow-like carriage may further comprise a drainage aperture located in the box bottom of each of the cargo boxes for draining fluids that collect in the cargo boxes.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 7 is a top view of a cart, according to an embodiment of the present invention; and FIG. 8 is a bottom view of a cart, according to an embodiment of the present invention.

Figure 1:
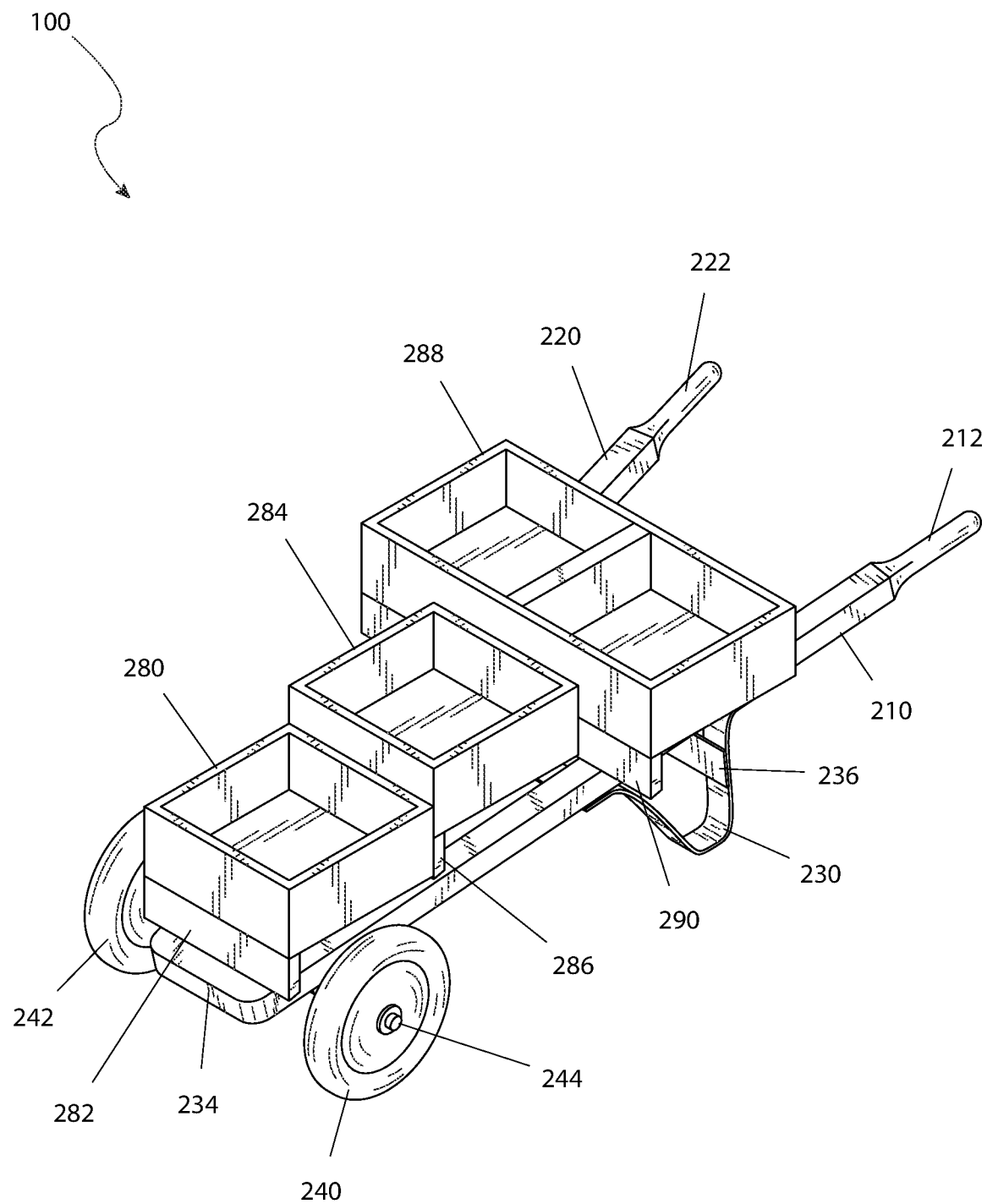
FIG. 1 is a front isometric view of a cart, according to an embodiment of the present invention.
Figure 2:
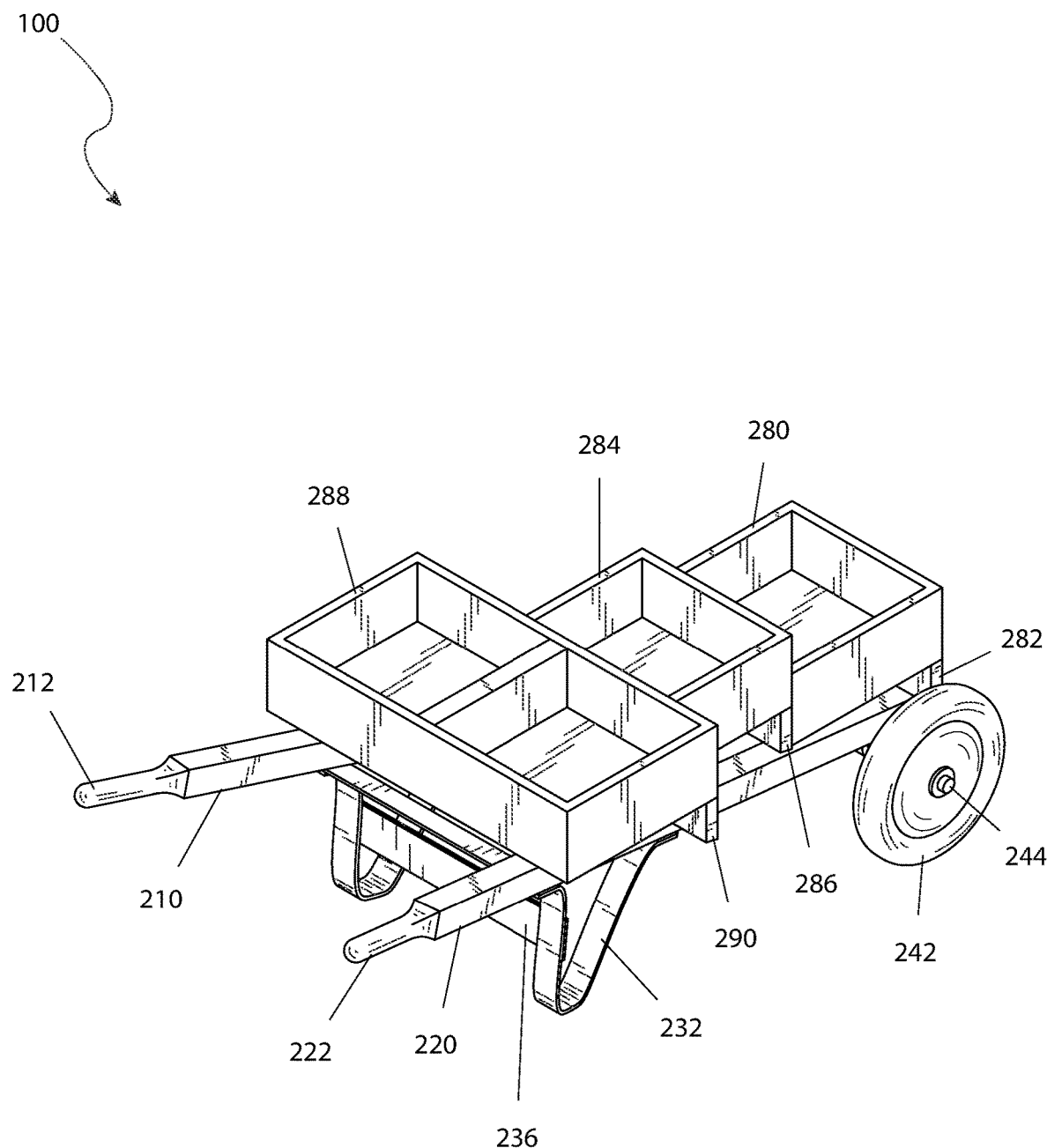
FIG. 2 is a rear isometric view of a cart, according to an embodiment of the present invention.
Figure 3:
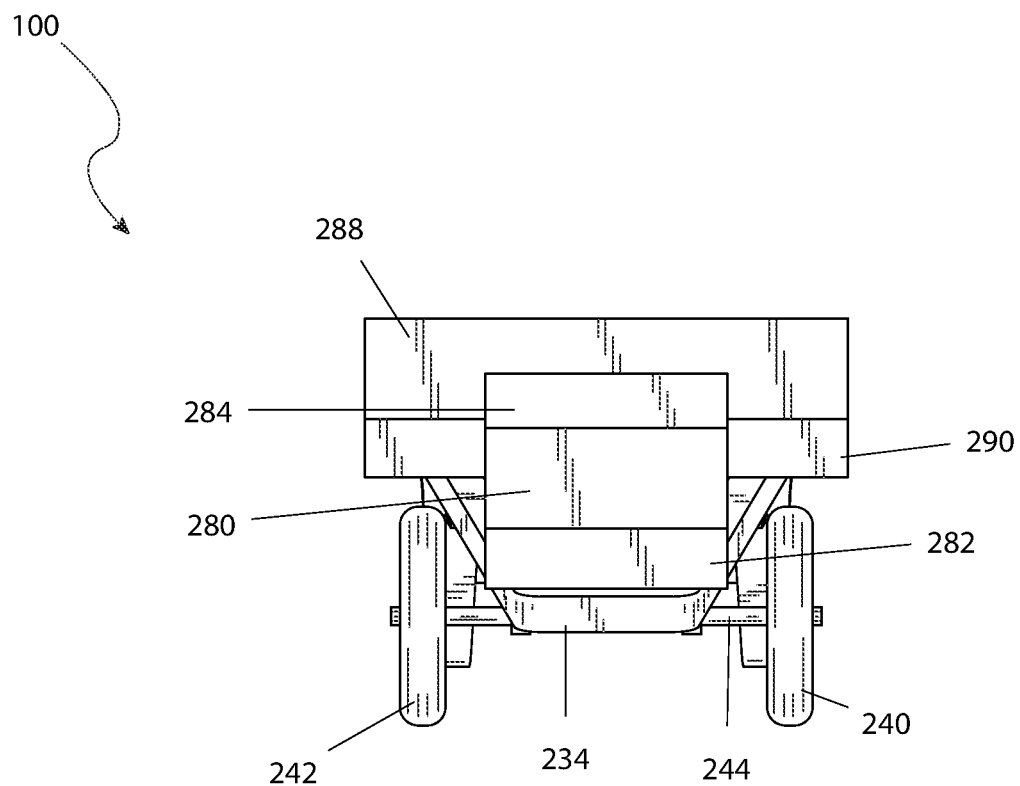
FIG. 3 is a front view of a cart, according to an embodiment of the present invention.
Figure 4:
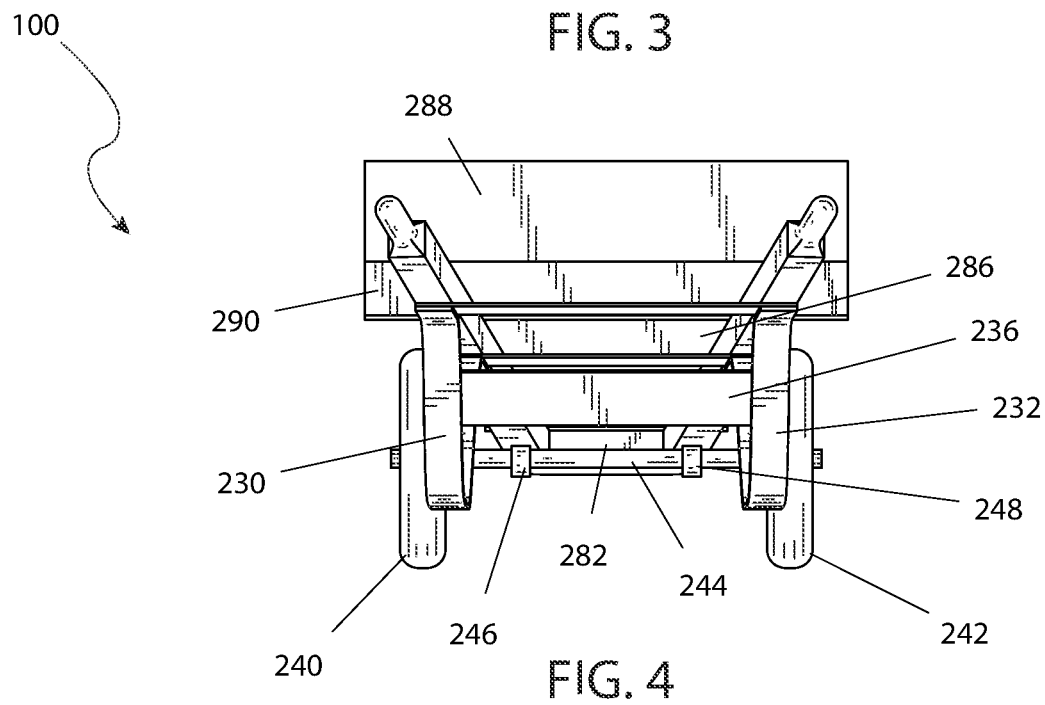
FIG. 4 is a rear view of a cart, according to an embodiment of the present invention.
Figure 5:
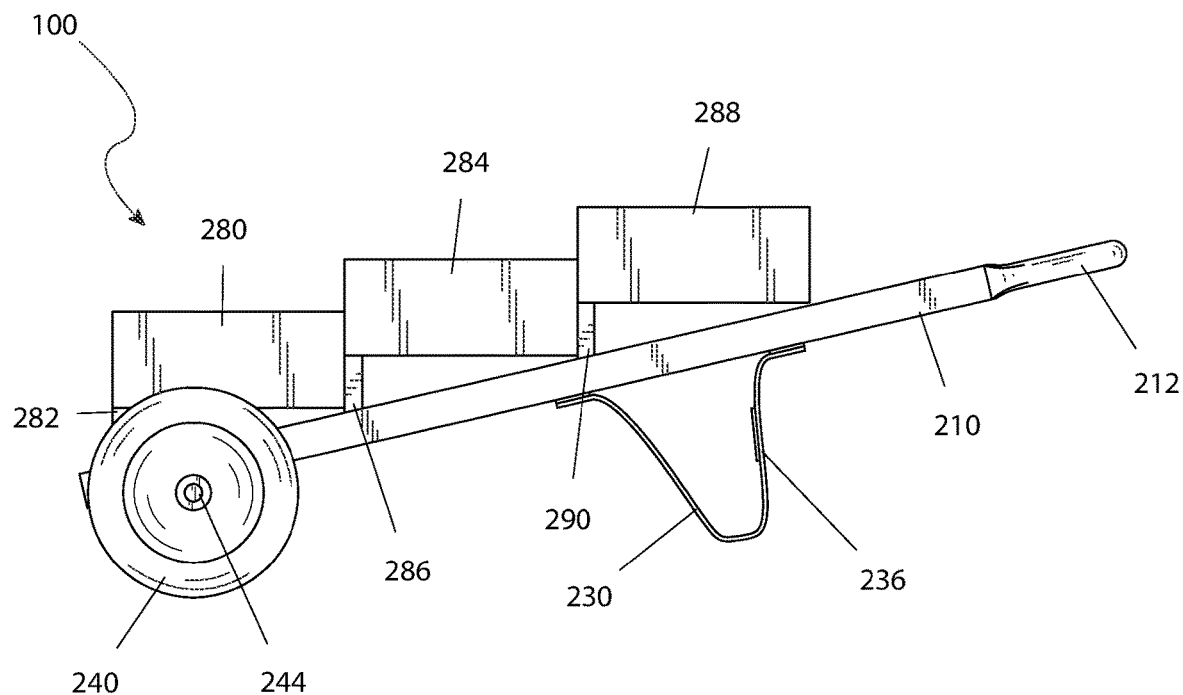
FIG. 5 is a left side view of a cart, according to an embodiment of the present invention.
Figure 6:
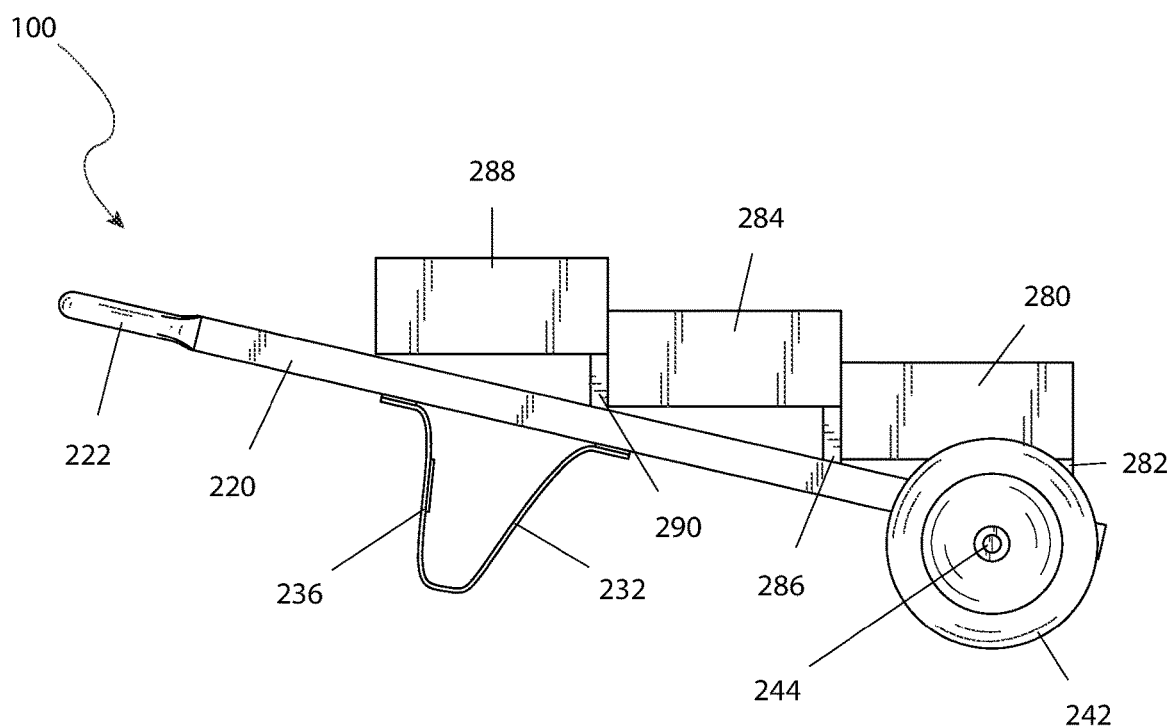
FIG. 6 is a right side view of a cart, according to an embodiment of the present invention.

| DESCRIPTIVE KEY | |
| --- | --- |
| 100 | cart |
| 210 | left handle |
| 212 | left hand grip |
| 220 | right handle |

-continued

| DESCRIPTIVE KEY | |
|---|---|
| 222 | right hand grip |
| 230 | left leg |
| 232 | right leg |
| 234 | front cross brace |
| 236 | leg cross brace |
| 238 | intermediate cross brace |
| 240 | left wheel |
| 242 | right wheel |
| 244 | axle |
| 246 | left axle mount |
| 248 | right axle mount |
| 250 | left side wall |
| 252 | right side wall |
| 254 | front wall |
| 256 | rear wall |
| 258 | box bottom |
| 274 | center divider |
| 280 | front cargo box |
| 282 | front cargo box spacer |
| 284 | center cargo box |
| 286 | center cargo box spacer |
| 288 | rear cargo box |
| 290 | rear cargo box spacer |

DESCRIPTION OF THE INVENTION

The present invention is directed to a cart (herein described as the "invention") 100. The invention 100 may comprise a frame, a wheel assembly, and a plurality of cargo boxes 280, 284, 288. The invention 100 may be a wheelbarrow-like carriage particularly suited for transporting a plurality of five gallon (5 Gal) buckets containing water. The plurality of cargo boxes 280, 284, 288 may be coupled to the top of the frame. The plurality of cargo boxes 280, 284, 288 may be held substantially level on the frame by a spacer 282, 286 290 located under the front of each box 280, 284, 288. The invention 100 may be adapted to be moved by a user when the user lifts the rear of the invention 100 by a left handle 210 and a right handle 220 and rolls the invention 100 forward on the wheel assembly.

The frame may comprise the left handle 210, the right handle 220, a left leg 230, a right leg 232, a front cross brace 234, and a leg cross brace 236. The left handle 210 and the right handle 220 may be oriented longitudinally and may be symmetrically spaced on either side of a longitudinal center line. The distance between the left handle 210 and the right handle 220 may be greater at the rear of the invention 100 than at the front of the invention 100.

The rear end of the left handle 210 may taper to form a left hand grip 212. The rear end of the right handle 220 may taper to form a right hand grip 222. The left hand grip 212 and the right hand grip 222 may be adapted for the user to grasp while moving the invention 100.

The left leg 230 may be coupled to the underside of the left leg 230 at a point located between the wheel assembly and the left hand grip 212. The right leg 232 may be coupled to the underside of the right leg 232 at a point located between the wheel assembly and the right hand grip 222. The left leg 230 and the right leg 232 may be located the same distance from the front of the frame. The left leg 230 and the right leg 232 may be operable to support the left handle 210 and the right handle 220 above the ground when the invention 100 is stationary.

The front cross brace 234 may couple the front of the left handle 210 to the front of the right handle 220. The front cross brace 234 may be oriented laterally across the frame and may establish the width of the front of the frame. The width of the front of the frame may be less than or equal to the width of the front cargo box 280.

The leg cross brace 236 may couple the left leg 230 to the right leg 232. The leg cross brace 236 may be located on the rear side of the left leg 230 and the right leg 232. The leg cross brace 236 may be oriented laterally across the frame and may establish a width for the frame at the rear end of the rear cargo box 288. The width of the frame at the rear end of the rear cargo box 288 may be less than or equal to the width of the rear cargo box 288.

In some embodiments, the frame may further comprise one (1) or more intermediate cross braces 238. The one (1) or more intermediate cross braces 238 may stabilize the frame. The one (1) or more intermediate cross braces 238 may couple the left handle 210 to the right handle 220, the left leg 230 to the right leg 232, or combinations thereof. The one (1) or more intermediate cross braces 238 may be oriented laterally across the frame. The one (1) or more intermediate cross braces 238 may be located at one (1) or more locations between the front cross brace 234 and the rearmost portion of the left leg 230 and the right leg 232.

The wheel assembly may comprise a left wheel 240, a right wheel 242, an axle 244, a left axle mount 246, and a right axle mount 248. The wheel assembly may reduce friction with the ground when the invention 100 is moved. The wheel assembly may be coupled to the underside of the front of the left handle 210 and the right handle 220.

The left wheel 240 and the right wheel 242 may be rotationally coupled to opposing ends of the axle 244. The left wheel 240 and the right wheel 242 may be aligned to be in parallel with each other and may be aligned with the frame such that the invention 100 may be easily pushed in a forward direction. The axle 244 may be coupled to the left handle 210 via the left axle mount 246 and to the right handle 220 via the right axle mount 248.

The plurality of cargo boxes 280, 284, 288 may be coupled to the top of the left handle 210 and the right handle 220. The plurality of cargo boxes 280 284 288 may be configured to retain the plurality of five gallon (5 Gal) buckets on the invention 100 while the invention 100 is moved.

Each cargo box 280, 284, 288 may comprise a left side wall 250, a right side wall 252, a front wall 254, a rear wall 256, and a box bottom 258. The box bottom 258 may support one (1) or more individual five gallon (5 Gal) buckets and the left side wall 250, the right side wall 252, the front wall 254, and the rear wall 256 may prevent the individual five gallon (5 Gal) buckets from sliding off of the invention 100.

Each cargo box 280, 284, 288 may be a single-wide cargo box or a double-wide cargo box. The single-wide cargo box may be square. The interior front-to-rear length and side-to-side width of the single-wide cargo box may be larger than the diameter of the bottom of an individual five gallon (5 Gal) bucket such that an individual five gallon (5 Gal) bucket may fit within the single-wide cargo box. In the exemplary embodiment, the front cargo box 280 and the center cargo box 284 may be single-wide cargo boxes. The double-wide cargo box may be rectangular. The interior front-to-rear length of the double-wide cargo box may be the same as the interior front-to-rear length of the single-wide cargo box. The interior side-to-side width of the double-wide cargo box may be at least twice the interior side-to-side width of the single-wide cargo box so that two (2) of the individual five gallon (5 Gal) buckets may fit within the double-wide cargo box. In the exemplary embodiment, the rear cargo box 288 may be a double-wide cargo box.

The rear cargo box 288, when in the double-wide configuration, may comprise a center divider 274 to separate two (2) of the individual five gallon (5 Gal) buckets. The center divider 274 may be oriented front-to-rear and may divide the rear cargo box 288 into two (2) sections of equal size. In some embodiments, the center divider 274 may be removable to facilitate carrying other cargo in the rear cargo box 288.

A front spacer 282 is located under the front edge of the front cargo box 280 and is attached thereto. A center spacer 286 is located under the front edge of the center cargo box 284 and is attached thereto. A rear spacer 290 is located under the front edge of the rear cargo box 288 and is attached thereto. The presence of the spacers 282, 286, 290 provides a means to level the respective cargo box 280, 284, 288 when the invention 100 is resting on the wheel assembly, the left leg 230, and the right leg 232.

In some embodiments, each of the plurality of cargo boxes 280, 284, 286 may comprise a drainage aperture located in the box bottom 258. The drainage aperture may provide a path for draining fluids that collect in the plurality of cargo boxes 280, 284, 286.

In use, a plurality of five gallon (5 Gal) buckets may be placed into the plurality of cargo boxes 280, 284, 286 and the plurality of five gallon (5 Gal) buckets may be filled with water. A bucket lid may be placed onto each of the individual five gallon (5 Gal) buckets. The preferred embodiment may be operable to carry up to four (4) of the individual five gallon (5 Gal) buckets. The user may lift the rear of the cart 100 from the ground using the left hand grip 212 and the right hand grip 222 and may push the cart 100 forward to move the water to another location. In some embodiments, the center divider 274 in the rear cargo box 288 may be removed and the rear cargo box 288 may be used to carry cargo other than the individual five gallon (5 Gal) buckets. As a non-limiting example, the rear cargo box 288 may be used to carry hay or other feed.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A wheelbarrow-like carriage, consisting of:
   a frame including a left handle, a right handle, a front cross brace, a leg cross brace, and at least one intermediate cross brace;
   a wheel assembly coupled to an underside of the frame, the wheel assembly consisting of a left wheel, a right wheel, an axle, a left axle mount, and a right axle mount; and,
   a plurality of cargo boxes coupled to the top of the frame, each of the plurality of cargo boxes consisting of a left side wall, a right side wall, a front wall, a rear wall, and a box bottom; and,
   wherein the front cross brace is oriented laterally across the frame and establishes a width of the front of the frame that is less than or equal to a width of a front cargo box of the plurality of cargo boxes;
   wherein the leg cross brace is oriented laterally across the frame and establishes a width of the frame at a rear end of a rear cargo box of the plurality of cargo boxes, the width of the frame being less than or equal to the width of the rear cargo box; and,
   wherein the at least one intermediate cross brace is oriented laterally across the frame and located between the front cross brace and the leg cross brace and,
   wherein each of the plurality of cargo boxes is held substantially level on the frame by a spacer located under a front edge of each of the plurality of cargo boxes, the spacers being attached to the respective cargo boxes; and,
   wherein the rear cargo box of the plurality of cargo boxes is a double-wide cargo box consisting of a center divider oriented front-to-rear, the center divider being removable to facilitate carrying cargo other than five-gallon buckets.

* * * * *